Figure 1:
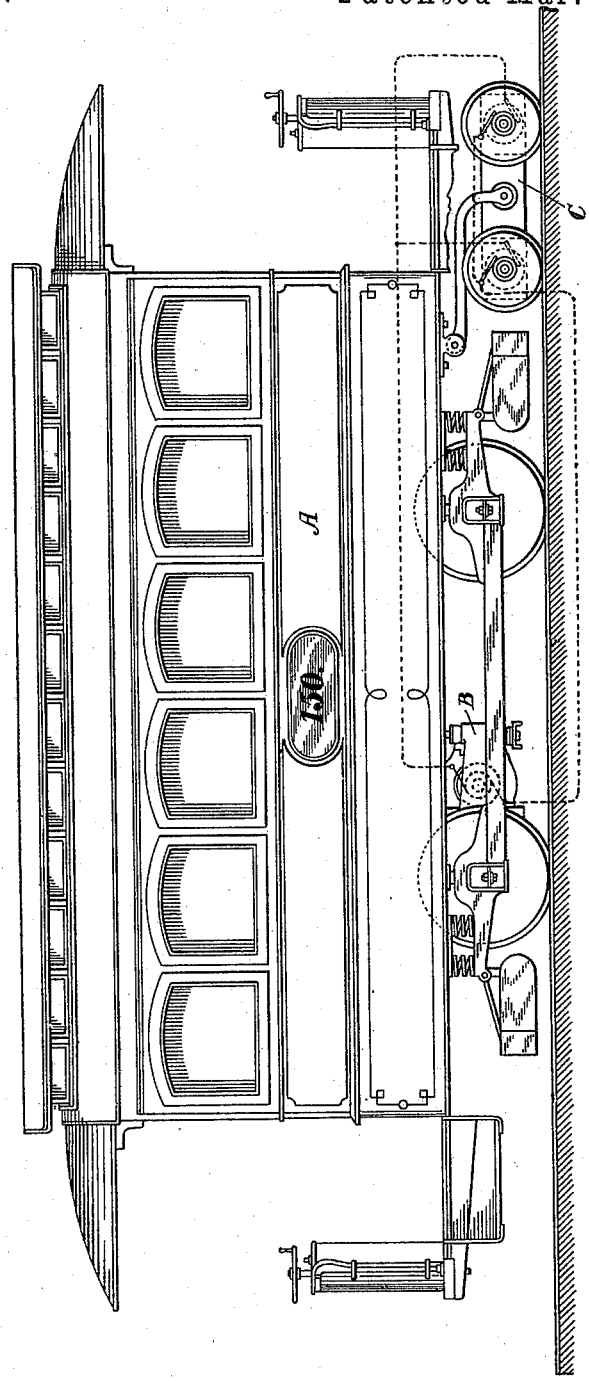

(No Model.) 5 Sheets—Sheet 1.

G. WESTINGHOUSE, Jr.
SYSTEM OF CIRCUITS AND APPARATUS FOR ELECTRIC RAILWAYS.

No. 579,525. Patented Mar. 23, 1897.

WITNESSES:

INVENTOR
George Westinghouse Jr.
BY
Charles A. Terry
ATTORNEY.

(No Model.) 5 Sheets—Sheet 3.

G. WESTINGHOUSE, Jr.
SYSTEM OF CIRCUITS AND APPARATUS FOR ELECTRIC RAILWAYS.

No. 579,525. Patented Mar. 23, 1897.

Witnesses
Inventor
George Westinghouse Jr.
By his Attorney (No Model.) 5 Sheets—Sheet 4.

G. WESTINGHOUSE, Jr.
SYSTEM OF CIRCUITS AND APPARATUS FOR ELECTRIC RAILWAYS.

No. 579,525. Patented Mar. 23, 1897.

WITNESSES: INVENTOR,
George Westinghouse Jr.
by Charles A. Terry Att'y.

(No Model.)  5 Sheets—Sheet 5.
G. WESTINGHOUSE, Jr.
SYSTEM OF CIRCUITS AND APPARATUS FOR ELECTRIC RAILWAYS.
No. 579,525.   Patented Mar. 23, 1897.
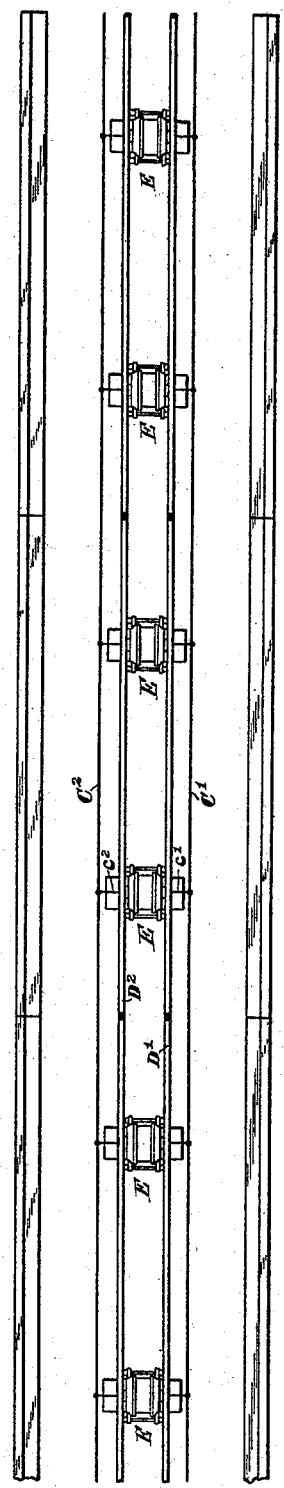

UNITED STATES PATENT OFFICE.

GEORGE WESTINGHOUSE, JR., OF PITTSBURG, PENNSYLVANIA.

SYSTEM OF CIRCUITS AND APPARATUS FOR ELECTRIC RAILWAYS.

SPECIFICATION forming part of Letters Patent No. 579,525, dated March 23, 1897.

Application filed August 20, 1891. Serial No. 403,223. (No model.)

*To all whom it may concern:*

Be it known that I, GEORGE WESTINGHOUSE, Jr., a citizen of the United States, residing in the city of Pittsburg, in the county of Allegheny and State of Pennsylvania, have invented a new and useful Improvement in Systems of Circuits and Apparatus for Electric Railways, (Case No. 431,) of which the following is a specification.

The invention relates to a system of circuits and an organization of apparatus for supplying electric cars with electricity by means of conductors located in the bed of the track.

In constructing an underground system of circuits it is desirable that the conductors supplying the current to the moving car should be protected, so that accidental contact may not be made therewith. It has been proposed to lay insulated sections of conductors along the bed of the track and to supply electric currents to these sections by means of a main conductor beneath the road-bed, this main conductor being placed in contact with the successive sections by means of circuit-closers operated by the movement of the car. Various forms of mechanical devices have been proposed for this purpose, but they have usually proved to be difficult to maintain in operative condition, and various other objections have heretofore been experienced.

My invention consists in providing electromagnetically-operated circuit-closers for connecting the main supply-conductors with sectional service-conductors during the passage of the vehicle to be supplied with currents, and the invention involves various details in the construction of the apparatus itself.

In the present preferred form of railway construction the rails are mounted upon chairs which are bolted firmly to the ties, the distance from the surface of the rail to the top of the tie being about eight or nine inches, in order that a good foundation may be secured for the tie and that there may be a suitable space for the proper paving of the street above the ties.

I propose to place one or more supplemental contact-rails between the two traction-rails and utilize these for conductors as well as to operate the magnetic circuit-closers. These rails may be of the ordinary T-head form and may be as high from the top to the base as from the top of the traction-rails to the ties. When two conducting or contact rails are used, one or both are laid in insulated sections and placed a suitable distance apart and firmly bolted to the ties or otherwise fastened, the sections being from ten to thirty feet, more or less, in length. At one or more points in each section I interpose a box having ends of magnetic material, but divided by a non-magnetic section, this non-magnetic section being provided with suitable insulating material, so that there shall be no electrical connection between the two magnetic ends. Within this box I arrange an armature either itself divided electrically by a suitable insulating material or carrying two insulated contacts.

One part of the armature or its insulated contact is arranged to come in contact with one magnetic end of the box and the other portion of the armature with the opposite end. The respective ends of this box are placed in magnetic as well as electrical connection with the respective contact-rails. The insulated part of the armature-sections are electrically connected with suitable electric conductors leading to and from a suitable electric generator. The normal position of the armature within the box is such that it is separated a slight distance from the magnetic ends of the box. When, however, a powerful electromagnet is brought into such position that its respective poles are in contact with the two contact-rails, the effect will be to close a magnetic circuit through the magnetic ends of the box and cause the armature to be drawn toward the poles thus formed, thereby closing the electric connections from the corresponding main conductors and each section of the armature to the corresponding rail.

For the purpose of thus magnetically affecting the rails a truck having two or four wheels may be used, each forming a part of an electromagnet. The truck or its wheels should therefore be electrically divided or insulated, so that the current may not pass from one rail directly across to the other through the truck. The wheels of the truck rolling upon the top of the rails will serve not only for the purpose of creating a magnetism which will bring the rails into electric connection with the proper conductors, but will at the same time serve as collectors of the electricity, which can then be conveyed by suitable connections to the motors. If it is desirable to use that apparatus in connection with an alternate-current motor—such, for instance, as the form of Tesla motor, requiring three conductors—the third wire may be connected to the outside rails, and the two inner rails will then form the other two electric conductors.

While it is evident that the truck may be made with either two, four, or more wheels, I usually prefer at least four, because each pair of wheels will have its appropriate electromagnet, and thus as the truck passes from one section to another the forward section will be brought into action before the rear wheels leave the one just traversed, and at the same time the electricity will be collected from four points instead of from two.

Instead of using two lines of contacts or conducting-rails one alone may be employed, the return being made through the traction-rails, and in some cases it may be found convenient to use the traction-rails as the conducting-rails, they being constructed in insulated sections. In such case it would be necessary to insulate the traction-wheels of the car upon opposite ends of the axles from each other.

A plan of carrying the invention into practice will be described more in detail in connection with the accompanying drawings, in which—

Figure 2:
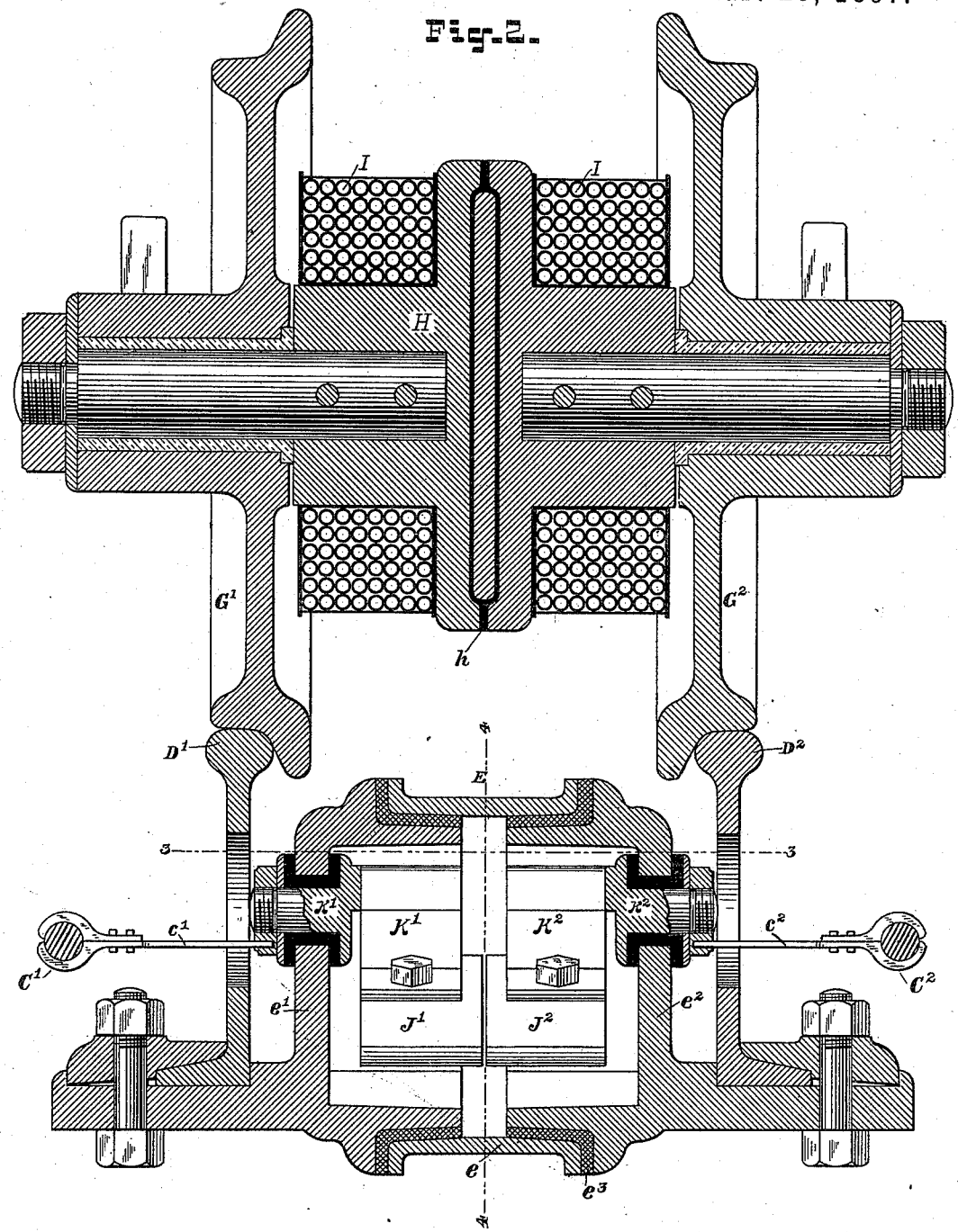
Figure 3:
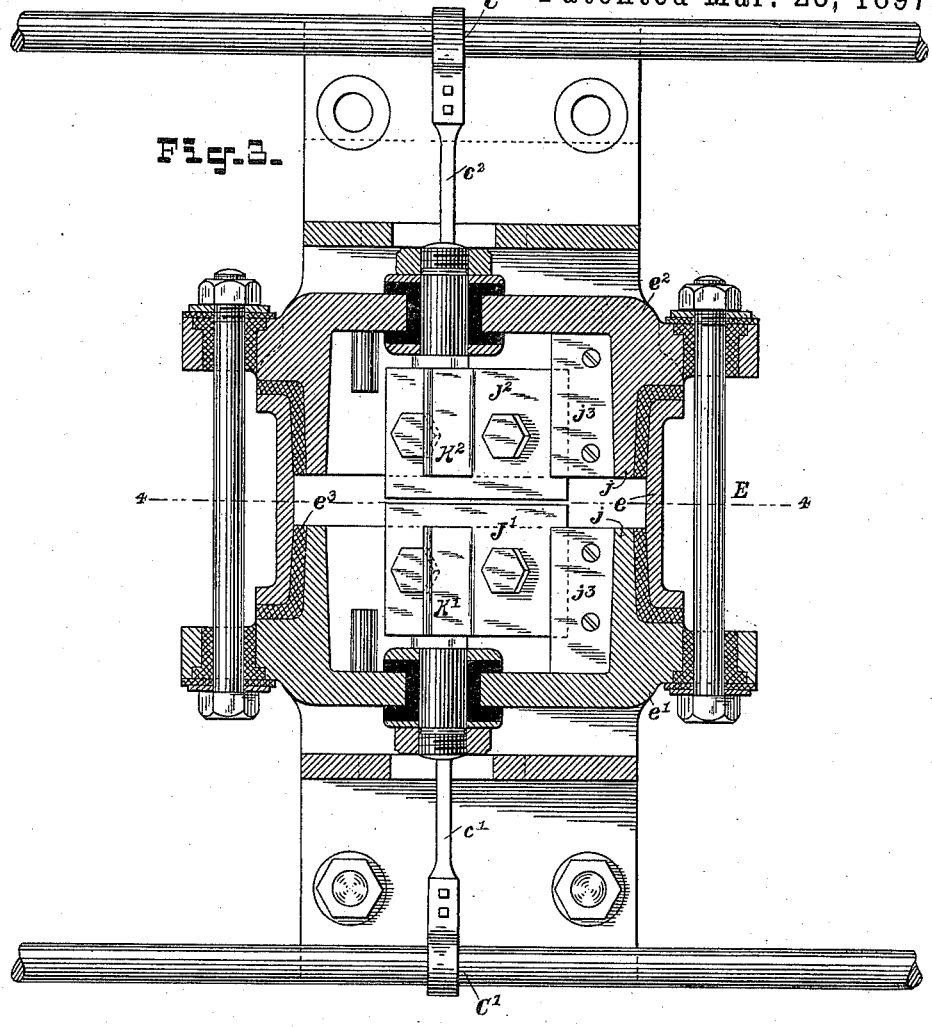
Figure 4:
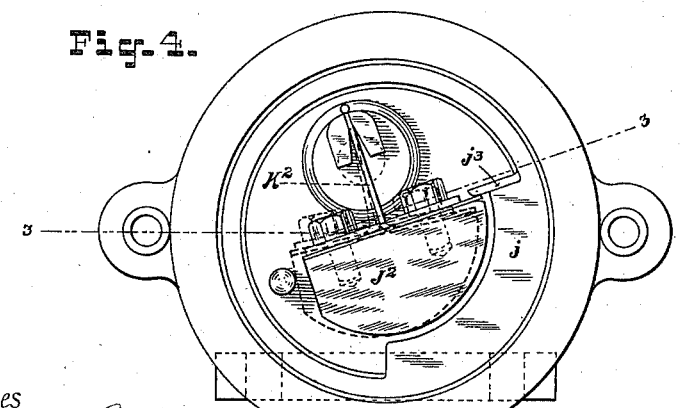
Figure 5:
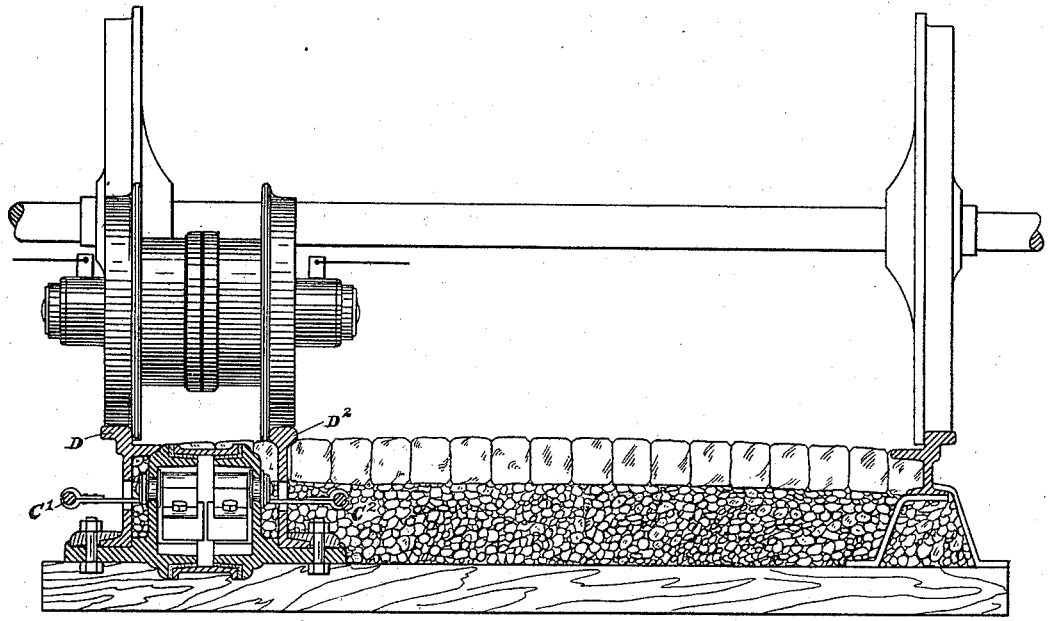

Figure 1 is an elevation of a car equipped with the operating apparatus, and Fig. 2 is a transverse section of the circuit-closing device and the electromagnetic apparatus for operating it. Fig. 3 is a section through the line 3 3 of Fig. 2, and Fig. 4 is a section through the line 4 4 of Figs. 2 and 3. Fig. 5 illustrates a modification. Fig. 6 is a plan of the circuit-closers.

Referring to the figures, A represents a vehicle or car which may be equipped with one or more suitable electric motors B for driving it. This car is provided with a contact device C, which, as shown in Figs. 1, 2, and 5, is a small truck.

Suitably-insulated supply-conductors $C'$ $C^2$ are laid along the road-bed. At intervals they are provided with circuit-closing boxes E, through which electric connections may be made with the sectional contact-conductors $D'$ $D^2$, which lie along the surface of the road-bed. These sectional conductors are shown as being in the form of rails, and upon them run contact-wheels $G'$ $G^2$, which are insulated from each other. The boxes E are constructed in two electrically-insulated sections $e'$ $e^2$, of magnetizable material, suitably held together by a band $e$, embedded in the insulation $e^3$, and by bolts $e^4$, also insulated from said sections. The boxes are tightly closed to prevent the access of moisture. Each section $e'$ and $e^2$ is provided with an inwardly-projecting flange $j$ for attracting, when magnetized, an armature $J'$ $J^2$ and completing the necessary electrical connections through contact-plates $j^3$, the latter being mechanically and electrically connected to the flanges $j$.

For the purpose of thus completing the electrical connections the axle H of the wheels $G'$ $G^2$ and the wheels themselves are continuously magnetized by means of coils I, surrounding the axle between the wheels. These coils are supplied with electric currents in any convenient manner. The current may be derived from the main supply-conductors or from an independent battery carried by the car. The coils are so wound that north and south poles will be developed at the flanges of the respective wheels, and these wheels, resting upon the respective rails, will continue the magnetic circuit to the two insulated sections $e'$ $e^2$ of the corresponding circuit-controlling box E. As these boxes are of iron, the magnetic circuit tends to complete itself through the boxes, but within the boxes are placed the movable iron armatures $J'$ $J^2$, carried upon flexible supporting-springs $K'$ $K^2$, which are in turn supported by insulated supports $k'$ $k^2$, the latter being connected with the main supply-conductors by the coupling-conductors $c'$ $c^2$. The armatures $J'$ $J^2$ carry contact-plates $j'$ $j^2$, respectively, and instead of being supported by the springs $K'$ $K^2$ they may be hinged directly to the supports $k'$ $k^2$, if desired. In the former case they are normally held out of contact with the respective contact-insulated contact plates or strips $j^3$, both by the spring action and by gravity, and in the latter case by gravity alone. These plates $j^3$ are respectively in circuit with the rails through the supporting-frame, and therefore when the armatures are drawn upward, as indicated in Fig. 4, the electrical connections will be completed from the supply-conductors with the corresponding sections of the contact conductors or rails, and thus currents will be conducted to the wheels $G'$ $G^2$. These wheels in turn are electrically connected with the terminals of the motor, as indicated in Fig. 1, and thus whatever current is desired is received from the wheels. When the wheels pass from one section to another, a magnetic circuit is first made through the new section, and electric connections are thus completed with the contact-rails. The circuit through the contact-rails just traversed is then broken by the armatures dropping back, and thus the connections are made and interrupted through the succeeding sections as the car travels through the length of the route.

It will be noticed that it is necessary, if two working conductors are thus employed, that the two wheels receiving the currents from the working conductors should be insulated from each other. For this purpose I have indicated in the drawings an insulated partition $h$, separating the two blocks which constitute the core of the magnetizing-coils and which may be fastened together by any suitable means. This insulation may be of whatever thickness is required in order to prevent the electric current from passing across from one wheel to the other. In like manner it is necessary either that the armatures $J'$ $J^2$ be separated from each other by an air-space or by insulating material or else that some equivalent means be adopted for preventing a short circuit through the box.

It is evident that various other forms of movable circuit-closing armatures may be employed and that the form of circuit-closer may be variously modified without departing from the spirit of my invention. Instead of employing contact-wheels such as are shown in the drawings, it is evident that sliding contacts might be employed.

In Fig. 5 a modification is shown in which the track-rails constitute one side of the magnetic circuit and system of conductors and only one supplemental rail is employed. In this instance the principle of construction is essentially the same as that already described. In this instance it may be desired to employ only one insulated circuit-closing device through which the sectional working conductor $D^2$ is electrically connected with the supply-conductor $C^2$ when the car is moving along the track, the other conductor $C'$ being at all times in electrical connection with the continuous track-rail D.

The circuit-closing wheels $G'$ $G^2$ may be carried in this instance, as before, either under the center of the car or at one end under the platform, and there may be two or more wheels, as the circumstances render it desirable.

I claim as my invention—

1. The combination with two lines of insulated sectional conductors and two supply-conductors, of a series of iron circuit-closing boxes for said sectional conductors each comprising two portions insulated from each other, movable magnetic devices within said boxes for completing electrical connections between the supply-conductors and the sectional conductors, and a traveling electromagnet for actuating said movable magnetic devices.

2. The combination with an electrically-operated car, of an electromagnet moving with the car, consisting of magnetic wheels or contacts electrically insulated from each other, a magnetic core for the same, coils wound upon said core, insulated sectional magnetic contact-rails for said contacts, an insulated supply-conductor, and a magnetic circuit-closing device for completing the connections between the supply-conductor and the sectional conductors comprising an iron box made in two parts insulated from each other and a movable armature actuated by said electromagnet.

In testimony whereof I have hereunto subscribed my name this 18th day of August, A. D. 1891.

GEO. WESTINGHOUSE, JR.

Witnesses:
JAMES W. SMITH,
CHARLES A. TERRY.